Patented Dec. 5, 1939

2,181,944

UNITED STATES PATENT OFFICE 2,181,944

PRODUCTION OF BLACK-AND-WHITE PHOTOGRAPHIC PICTURES

Johannes Kleine, Dessau, and Gustav Wilmanns, Wolfen, Kreis Bitterfeld, Germany, assignors, by mesne assignments, to Agfa Ansco Corporation, Binghamton, N. Y., a corporation of Delaware No Drawing. Application November 18, 1937, Serial No. 175,284. In Germany November 26, 1936

1 Claim. (Cl. 95—6)

Our present invention relates to photography and more particularly to a photographic light-sensitive element yielding black-and-white pictures free from silver.

The production of photographic color pictures which are free from silver by converting silver pictures into dyestuff pictures in a suitable manner is known. One process consists in producing a dyestuff picture by color forming development or by azo-coupling in a silver halide emulsion which contains dyestuff components. In the production of pictures by color forming development the dyestuff components may also be added to the developer. Insofar as the silver picture has not already been removed during the production of the dyestuff picture, as happens for instance in the silver bleaching out process, the silver picture is subsequently removed by means of a known solvent for silver.

It is an object of the present invention to provide a new and improved light-sensitive material capable of being converted into black-and-white pictures by a process of color forming development.

A further object is the provision of a photographic light-sensitive material comprising a silver halide emulsion containing a dyestuff component fast to diffusion and capable of forming a black dye with the oxidation product of a developer.

A further object is to provide a process by which black-and-white pictures are obtained from the aforementioned material by color forming development, which are free from silver.

Further objects will be apparent from the detailed specification following hereafter.

This invention is based on the observation that black-and-white pictures free from silver may be obtained if there is added to the silver halide emulsion a dyestuff former which can be converted into a black dyestuff. The treatment of the silver halide emulsion for producing the black dyestuff picture varies according to the dyestuff former used.

When applying dyestuff components for color forming development these are converted directly into color pictures by suitable developers.

As dyestuff components especially those are of importance for the purpose of this invention in which the coupling group is linked to a polynuclear radical, for instance 1,2-hydroxy-naphthoic acid-aminocarbazole, or amniophenyl-hydroxynaphthothiazole-sulfonic acid of the following formula

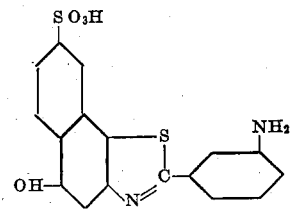

Further there may be obtained components which are useful for the present purpose by linking several dyestuff components which individually form different colors by color forming development. Thus it is, for instance, possible to link up components which yield blue, green, red dyes or components yielding complementary colors such as for instance blue and yellow by color forming development. The linking of the molecules of these dyestuff components may be effected in known manner, for instance by linking carboxyl-, amino-, hydroxy-, or sulfo groups to yield acid amides or esters.

In order to increase the content of black or the resultant dyes it is possible to introduce suitable substituents into the molecule of the aforementioned dyestuff components, such as for instance nitro- or halogen groups. This p-nitrobenzoylacetic-5-hydroxynaphthylamide of the following formula

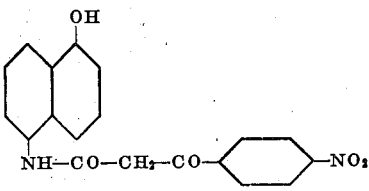

is a suitable component.

These dyestuff components may be developed with the aid of the usual color forming developers, such as for instance para-diethylaminoaniline. A further increase in the absorption of the resultant dyes may be obtained by using developers which contain in their molecule the substituents mentioned above, such as for instance halogens.

It is preferable to use dyestuff components, which by introduction of certain radicals, have been made fast to diffusion in the binding medium. As described in U. S. patent application Ser. No. 72,718 filed April 4, 1936, there may be introduced into the dyestuff components groups which lend to the molecule of the dyestuff former substantive character. As described in U. S. patent application Ser. No. 90,726 filed July 15, 1936, the dyestuff components may be made fast to diffusion by introducing radicals of highly polymeric carboxylic acids or derivatives thereof. Furthermore, dyestuff components can be made fast to diffusion by introducing carbon chains of more than 5 carbon atoms as described in U. S. patent application Ser. No. 94,340 filed August 5, 1936, polypeptide radicals as described in U. S. patent application Ser. No. 158,860 filed August 13, 1937, carbohydrate radicals as described in U. S. patent application Ser. No. 159,518 filed August 17, 1937, resin radicals as described in U. S. patent application Ser. No. 164,499 filed September 18, 1937, and according to a further suggestion sterol, into the component. Finally dyestuff components fast to diffusion are obtained by combining several molecules for the color former to yield a chain-like molecule in which the reactive group of the color former recurs periodically.

The following compounds may be named by way of example: N-dodecyl-1.2-hydroxynaphthoic acid-aminocarbazole, dodecoylaminophenyl-hydroxynaphthothiazole sulfonic acid, 4,α,hydroxynaphthoyl-4',p-nitrobenzoyl-monobromacetyl dichlorbenzidide.

If the dyestuff components do not yield sufficiently dark shades in the color forming development the dyestuff picture produced by the development may be converted into a darker dyestuff by subsequent treatment; for example, a dyestuff component may be used which yields on color forming development a dyestuff still containing one or more free amino groups which may be diazotized and coupled with azo-components; or, by action of diazo-components on dyestuff components having groups capable of coupling, such as —NH₂, —OH, or the like, a deeper shade may be produced. In using dyestuff components for color forming development the picture may be produced by simple development or by reversal development, for instance by the process of U. S. patent applications Ser. No. 100,319 filed September 11, 1936 and Ser. No. 148,731 filed June 17, 1937. After the development the silver is removed from the layer in a known manner, for example by means of Farmer's Reducer.

Again, dyestuff components fast to diffusion may be used as described in U. S. patent application Ser. No. 10,704 filed March 12, 1935, the dyestuff picture being produced by azo-coupling. Also light-sensitive layers having, as described in U. S. patent application Ser. No. 111,250 filed November 17, 1936, color formers fast to diffusion are suitable in which the color picture is produced by destroying directly or indirectly the dyestuff former or the formed dyestuff overlying the silver picture.

The production of black-and-white pictures by the present invention is of particular advantage because the silver used for producing the emulsion layer may be recovered substantially completely in the development installation. In view of the value of silver this point is of great commercial advantage.

The invention is applicable in all cases in which black-and-white silver pictures are used, especially in the production of sound films. By suitable choice of the dyestuff components the toning of the picture may be varied within wide limits. If desired a mixture of several dyestuff components may be used. The dyestuff components may be contained in one or several layers which may be arranged on one or both sides of the support. Pictures to be viewed by transmitted light and those that are to be viewed by reflected light may be produced by the invention. The pictures obtained are characterized by particularly fine grain and are suitable therefore for the production of enlargements.

What we claim is:

A silver halide emulsion containing a colorless dyestuff component containing a naphthol ring being fast to diffusion in the emulsion, being capable of reacting with the oxidation products of an amino developer to produce a black dyestuff, and being selected from the class consisting of hydroxy-naphthoic acid-aminocarbazoles, aminophenyl-hydroxy-naphthothiazole sulfonic acids, nitro - benzoylacetic - 5 - hydroxynaphthylamides and hydroxynaphthoyl-p-nitrobenzoyl-monobromacetyl-dichlorbenzidides.

JOHANNES KLEINE.
GUSTAV WILMANNS.